(12) United States Patent
Burgese

(10) Patent No.: US 7,743,517 B1
(45) Date of Patent: Jun. 29, 2010

(54) GUIDE FOR ESTABLISHING REVEAL ON DOOR AND WINDOW FRAMES DURING MOLDING INSTALLATION

(76) Inventor: Jason Burgese, 633 Buyers Rd., Collegeville, PA (US) 19426

( * ) Notice: Subject to any disclaimer, the term of this patent is extended or adjusted under 35 U.S.C. 154(b) by 0 days.

(21) Appl. No.: 12/454,540

(22) Filed: May 19, 2009

(51) Int. Cl.
*G01B 5/14* (2006.01)
*G01B 3/30* (2006.01)
*E04F 21/00* (2006.01)

(52) U.S. Cl. .............................. 33/194; 33/42; 33/464
(58) Field of Classification Search .................. 33/194, 33/42–44, 464, 480, 646–649, 562, 567, 33/41.1, 41.6
See application file for complete search history.

(56) References Cited

U.S. PATENT DOCUMENTS

| | | | |
|---|---|---|---|
| 445,646 A * | 2/1891 | Welsh | 33/44 |
| 2,144,697 A * | 1/1939 | Zangrando | 33/527 |
| 2,473,639 A * | 6/1949 | Erickson | 33/42 |
| 3,386,177 A | 6/1968 | Von Koscielski | |
| 3,753,556 A | 8/1973 | Nix | 269/97 |
| 3,999,300 A | 12/1976 | Ban | 33/174 |
| 4,355,471 A | 10/1982 | Cross | 33/422 |
| 4,715,590 A | 12/1987 | Segarra | 269/76 |
| 4,989,336 A | 2/1991 | Waltrip, Jr. et al. | 33/526 |
| 5,123,172 A | 6/1992 | Thrun | 33/526 |
| 5,604,988 A | 2/1997 | Costelloe | 33/501 |
| 5,737,844 A | 4/1998 | Brumley | 33/194 |
| 5,775,036 A * | 7/1998 | Stanley, Sr. | 33/194 |
| 6,230,413 B1 | 5/2001 | Reiley | 33/194 |
| 6,305,091 B1 | 10/2001 | Tegels | 33/194 |
| 6,341,427 B1 | 1/2002 | Tepley | 33/194 |
| 6,442,853 B1 | 9/2002 | Hale et al. | 33/194 |
| 6,513,258 B1 * | 2/2003 | Casner | 33/194 |
| 6,532,674 B2 * | 3/2003 | Farese | 33/194 |
| 6,807,777 B2 | 10/2004 | Wagner et al. | 52/204.1 |
| 6,810,592 B1 | 11/2004 | Oldfield, Jr. | 33/194 |
| 6,868,613 B2 | 3/2005 | Sumner | 33/194 |
| 6,954,989 B1 | 10/2005 | Morton | 33/194 |
| 7,069,659 B1 * | 7/2006 | Rye | 33/194 |
| 7,240,435 B1 * | 7/2007 | Dowdakin | 33/194 |
| 7,240,436 B1 | 7/2007 | Miller et al. | 33/194 |
| 7,467,471 B1 * | 12/2008 | Sutter | 33/194 |
| 7,472,492 B1 * | 1/2009 | Vecchio | 33/562 |
| 7,513,049 B2 * | 4/2009 | Williams | 33/42 |
| 2002/0133957 A1 * | 9/2002 | Farese | 33/194 |

* cited by examiner

*Primary Examiner*—Yaritza Guadalupe-McCall
(74) *Attorney, Agent, or Firm*—Michael F. Petock, Esq.; Petock & Petock, LLC

(57) ABSTRACT

A guide preferably of small size preferably two and a half inches square is disclosed for establishing reveal on doors and window frames during molding installation without having to do measuring and marking. In one embodiment two square blocks making up the guide are fixedly attached to each other and a different guide is used for different molding reveals. In another preferred embodiment of the present invention, the position of the two blocks relative to each other is adjustable such that one block moves along the other block only along a diagonal providing a simple single adjustment which provides the same amount of reveal on two orthogonal sides of the guide.

4 Claims, 4 Drawing Sheets

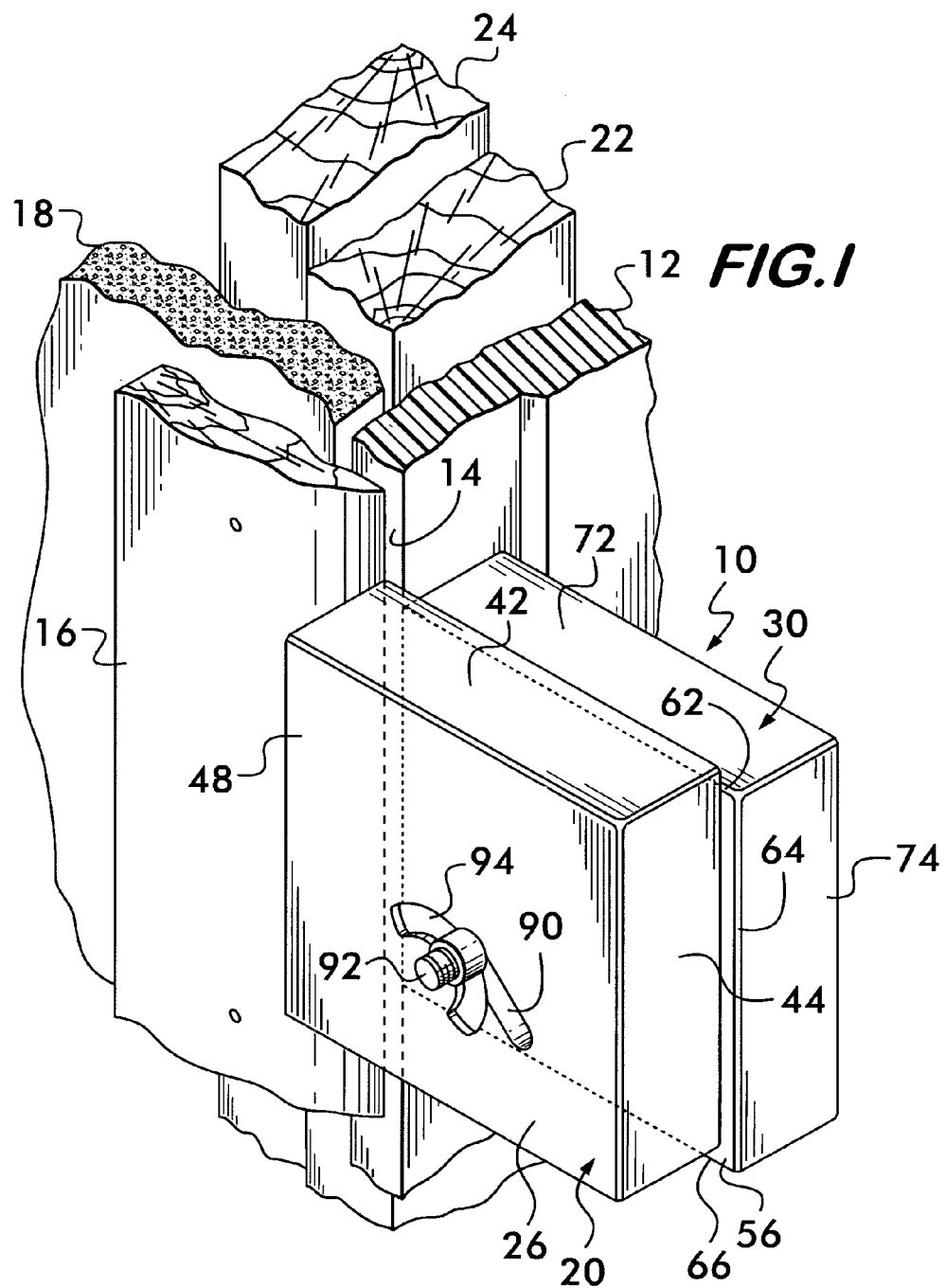

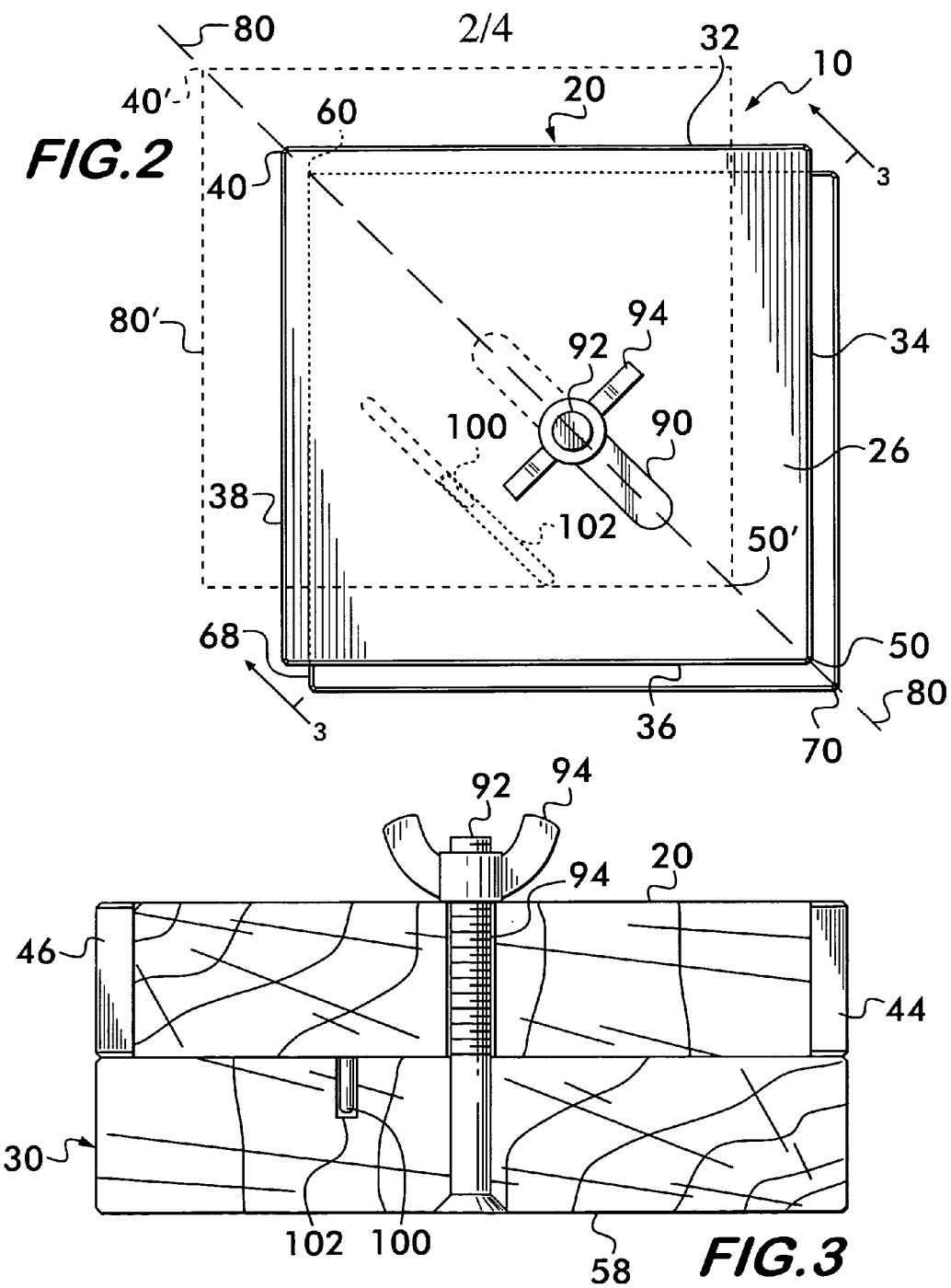

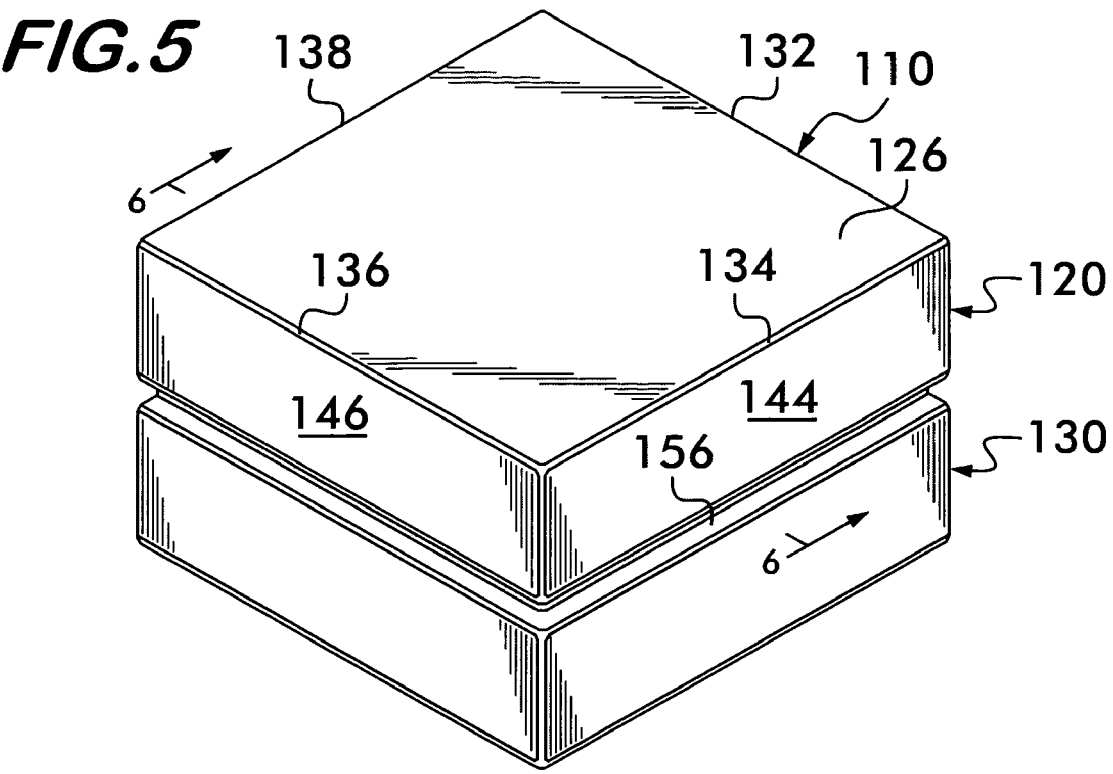
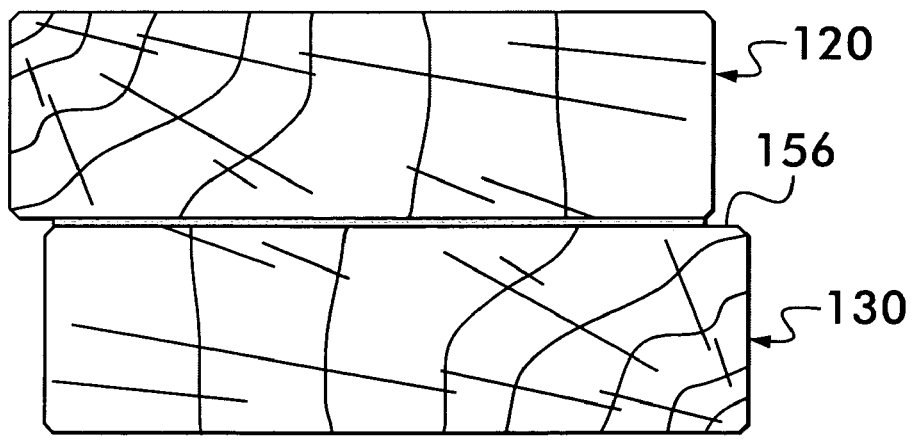

GUIDE FOR ESTABLISHING REVEAL ON DOOR AND WINDOW FRAMES DURING MOLDING INSTALLATION

FIELD OF THE INVENTION

The present invention relates to a guide for establishing reveal on door and window frames during molding installation. More particularly, the present invention is directed to a compact easily carried and readily usable guide which is usable simultaneously in two orthogonal directions and may be adjustably simultaneously and equally in two orthogonal directions in a single adjusting operation.

BACKGROUND OF THE INVENTION

Typically the molding which covers the gap between the window or door frame and the drywall or other surfacing of the interior of a building is offset from the edge of the window or door frame by a dimension such as a quarter of an inch, an eighth of an inch, three eighths of an inch or the like. This process of installing this molding often requires multiple measurements and markings on the framing to install the molding correctly along the entire length of the window or door frame. This is a time consuming process which also places marks on the window or door framing which then must be removed in the case of staining or adequately painted over. Further, it is time consuming to measure and mark the frame in multiple locations.

Several attempts have been made at providing such a guide or jig for the installation of molding, but these have not been satisfactory. For example, see U.S. Pat. No. 5,737,844-Brumley, No. 5,604,988-Costelloe, and No. 5,123,172-Thrun.

SUMMARY OF THE INVENTION

The present invention provides several advantages in the installation of molding on doors and or window frames. One advantage of the present invention is that its square shape may be produced to provide molding installation without marking in two orthogonal directions, that is along the top and side of the window or door simultaneously.

Another advantage of the present invention is that its square shape enables it to be fabricated in a relatively small size which may be readily held within a carpenter's bag worn on the waist of the carpenter or in a pocket or other similar location of the carpenter or person doing the molding installation.

Another advantage of the present invention is that it is relatively economical to manufacture.

Another advantage of the present invention is that it is adjustable, and is adjustable by means of one adjustment structure which provides adjustment in equal amounts in both of the two orthogonal directions simultaneously, that is for use on the top and side of the door or window frame simultaneously in one adjusting operation.

Briefly and basically, in accordance with the present invention, a molding guide is provided which comprises a first block having the shape of a square prism having a face with four edges of a first predetermined length with rectangular sidewalls. A second block having the shape of a square prism having a face with four edges of the same predetermined length as the first block and having rectangular sidewalls. The first and second blocks are attached to one another in such a manner that a square face to a square face are juxtaposed and that the first block and the second block are offset such that each sidewall of the square block is parallel to one of the adjacent sidewalls of the second block. A diagonal can be drawn through two corners of each block with one line. Further, the offset is equal to the desired predetermined molding reveal.

In accordance with the present invention, the first and second blocks may be fixedly attached or they may be adjustably attached.

Where the blocks are adjustably attached, the first block can only move in such a way that the diagonal between the two corners of the first block remains collinear with the diagonal of the second block.

In accordance with a preferred embodiment of the present invention, this adjustability is provided by a channel created in the first block along the diagonal. A bolt is mounted normal to the face and on the center of the square face of the second block with the bolt passing through the channel of the first block. A fastener on the bolt releasably secures the first and second blocks relative to each other. A guide element is fixedly attached to one of the blocks. The guide element is placed off the diagonal line and protrudes normal to the face juxtaposed the other block face. A guiding groove is formed in the other of the two blocks deep enough to house the guide element and the guiding groove is formed in a line parallel to and offset from the diagonal at a position across from the guide element on the square face of the other block.

In this manner, by loosening the fastener on the bolt, the block may be moved along the diagonal with the same amount of offset being produced along two orthogonal sidewalls thereby providing the same amount of reveal for both orthogonal directions, such as the upper molding piece and the side molding piece of a door or window.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a view in perspective, partially broken away illustrating the use of a guide in accordance with the present invention establishing the reveal on a door or window frame. The guide illustrated in FIG. 1 is adjustable.

FIG. 2 is a plan view of the face of the guide illustrated in FIG. 1. FIG. 2 shows a second adjusted position in dotted lines of the upper block.

FIG. 3 is a cross sectional view taken along line 3-3 of FIG. 2.

FIG. 5 is a view in perspective of another embodiment of the present invention wherein the two blocks of the guide are fixed.

FIG. 6 is a cross section view taken along line 6-6 of FIG. 5.

DETAILED DESCRIPTION OF THE PREFERRED EMBODIMENTS

Figure 4:
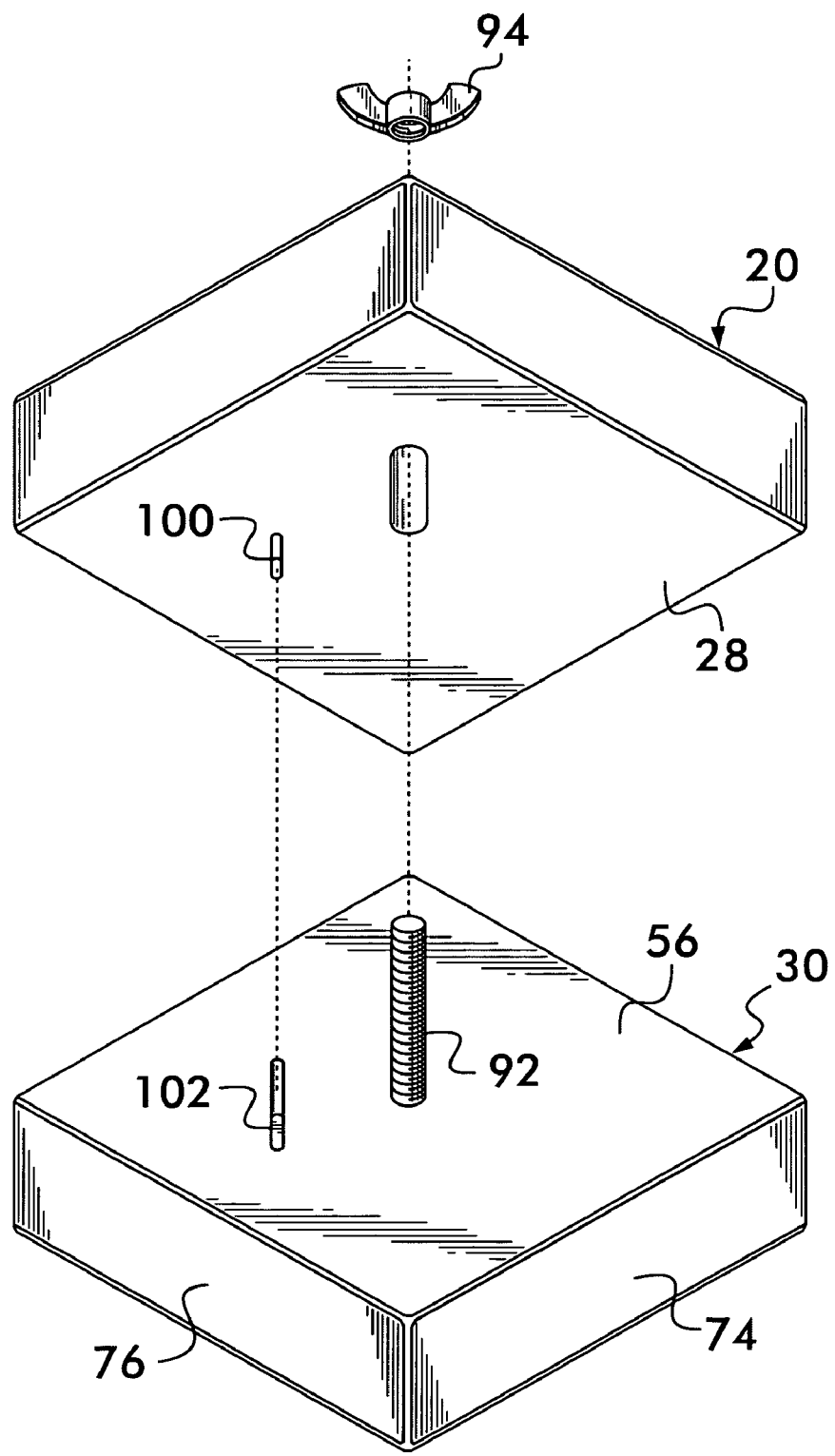
FIG. 4 is an exploded view in perspective of the two blocks of FIG. 1 showing the two blocks of the guide of FIG. 1 separated. This figure also illustrates the guide element in one block and the guide channel in the other block.

Referring now to the drawings, wherein like numerals indicate like elements, there is shown in FIG. 1 a guide 10 for establishing the reveal on doors and window frames during molding installation. As illustrated in FIG. 1, molding guide or guide 10 is applied with one of its rectangular side walls against a frame 12 of a door or window with the sidewall of another block establishing a reveal 14 of the frame 12 where the molding 16 abuts the sidewall and is applied. The frame or framing 12 is typically three quarters of an inch thick, but may be of other suitable dimensions depending upon the particular window or door frame. The reveal 14 is usually selected to be a percentage of the thickness of the window or door frame 12. Typically where the frame is three quarters of an inch, the reveal may be one quarter of an inch, three eights of an inch or one eighth of an inch or other suitable desired reveal. The window or door frame 12 is typically secured by nailing, screwing or other fasteners to framing studs 22 and 24. Studs 22 and 24 are shown as being partially broken away, but may be two by fours, two by sixes or other suitable framing material. Additionally, dry wall 18 is applied and secured to framing studs 22 and 24, typically by nailing, screwing and/or gluing. Wall covering 18 may typically be dry wall, but other suitable wall covering materials may be utilized. Molding 16 covers the gap between the dry wall 18 and the window or door framing 12. Molding 16 may be secured to both the studs 22 or 24 and with small finishing nails to frame 12. Guide 10 may be utilized to position the molding for nailing without having to measure and/or mark the framing as to the offset or amount of reveal to be provided on frame 12.

Referring now more particularly to FIGS. 1, 2, 3 and 4, the structure of guide or molding guide 10 will be described in greater detail. Guide 10 is comprised of a first block 20 having a shape of a square prism having a face 26 with four edges, 32, 34, 36 and 38 of a first predetermined length. This first predetermined length preferably may be two and one half inches, but other suitable dimensions may be utilized. First block 20 may be provided with rectangular sidewalls 42, 44, 46 and 48.

A second block 30 having a shape of a square prism is provided. Second block 30 has a square face 56 and has four edges 62, 64, 66 and 68 of the same predetermined length as the first block. Since both the first and second blocks are squares, all four edge dimensions of each block are equal. Similar to the first block 20, the second block 30 is provided with rectangular sidewalls 72, 74, 76 and 78.

First block 20 second block 30 are attached, adjustably as shown in FIGS. 1 through 4 and fixedly as shown in FIGS. 5 and 6 to be discussed hereinafter, to one another, square face 28 of block 20, best seen in FIG. 4 is attached or juxtaposed to square face 56 of second block 30. Blocks 20 and 30 are attached in such a way that first block 20 and second block 30 are offset such that each sidewall of each block is parallel to one of the adjacent sidewalls of the other block. This is best illustrated in FIGS. 1 and 2. Further, these blocks are arranged such that a diagonal can be drawn to two corners of each block with one line. This is best illustrated for example, as may be best seen in FIG. 2, a diagonal can be drawn through two corners 40 and 50 of first block 20 and the same line passes through corners 60 and 70 of second block 30. A corner is an intersection of two edges or rectangular surfaces of a block.

The offset between the sidewalls of edges of the first block 20 and the second block 30 is equal to the desired predetermined or selected molding reveal 14.

The adjustability structure of FIGS. 1-4 will be discussed herein below, but attention is now directed to FIGS. 5 and 6 where the structure just described is illustrated as a guide or molding guide 110 comprised of a first block 120 fixedly mounted or attached to a second block 130 such as by glue, molding or suitable fasteners. As described with respect to the other embodiment, first block 120 has the shape of a square prism having a square face 126. The face 126 of first block 120 is provided with four edges of equal length of a first predetermined length. These edges are labeled 132, 134, 136 and 138. Block 120 is also provided with rectangular sidewalls with sidewalls 144 and 146 being illustrated in FIG. 5.

Similarly, second block 130 is provided with a face 156 having four edges of equal length and of lengths equal to the lengths of the edges of the first block 120. The structure of the fixed embodiment of FIGS. 5 and 6 is substantially identical to that of FIGS. 1 through 4 except that it does not include the structure for adjustability, the blocks are fixed one to the other and guides with differing offsets between first block 120 and second block 130 would be required for different selected door or window frame reveals.

Referring now back to the adjustable embodiment illustrated in FIGS. 1 through 4, as best illustrated in FIG. 2, molding guide 10 is constructed such that blocks 20 and 30 are adjustably attached to each other such that the first block can only move in such a way that the diagonal between the two corners 40 and 50 of first block 20 remains collinear with the diagonal of block 30 running through corners 60 and 70, or in other words on line 80 with the diagonal of second block 130 as defined by line 80 passing through corners 60 and 70 of block 30. In other words, line 80 is the diagonal of both blocks and the diagonal of both blocks is collinear no matter how guide 10 is adjusted to provide different amounts of reveal. In this manner, the amount of reveal provided for is equal on all sides. An adjustment for a large reveal 14 is shown in block 20 in dotted lines at 20' and the diagonal line 80 still passes through corners 40' and 50'.

A presently preferred and particular manner of providing the adjustability to provide equal adjustment of the offset of the box which corresponds to the amount of reveal is provided by the structure illustrated in FIGS. 1 through 4. A channel 90 is created in first block 20. Chanel 90 is created in the first block 120 along diagonal illustrated by line 80. A bolt or other suitable fastener 92 is mounted normal to the face 56 of second block 30. Bolt or fastener 92 is mounted on the diagonal line 80 and the center of square face 56 of second block 30. The bolt or fastener 92 passes through channel 90 in first block 20. Bolt or fastener 92 may pass through second block 30 as illustrated in FIG. 3 or may be mounted partially into second block 30 or may be mounted by suitable means to the surface of second block 30.

A fastener 94, such as a wing nut as illustrated or other suitable fastener on bolt 92 releasable secures the first and second blocks relative to each other. In other words fastener 94 may be released to adjust the position of first block 20 with respect to second block 30 to provide different amounts of reveal. When adjusting and moving on the diagonal line 80, the amount of reveal change provided between adjacent sidewall surfaces of the first block and the second block 30 are equal.

In order to keep first block 20 from rotating with respect to second block 30, a guide element 100 is attached to one of the blocks. The guide element 100 is placed off of the diagonal line 80 and protrudes normal to the face juxtaposed of the other block face. A guiding groove 102 is formed in the other of the two blocks deep enough to house guide element 100. The guiding groove is formed in a line parallel to an offset from diagonal line 80 at a position across from guide element 100 on the square face of the other block. In this manner, by loosening wing nut or fastener 94, first block 20 may be moved along the diagonal line 80 only, thereby adjusting the reveal by the same amount between corresponding sides of the first block 20 and the second block 30.

The present invention may be embodied in other specific forms without departing from the spirit or essential attributes thereof and, accordingly, reference should be made to the appended claims, rather than to the foregoing specification as indicating the scope of the invention.

I claim:

1. A molding guide, comprising:

a first block having a shape of a square prism having a face with four edges of a first predetermined length with rectangular sidewalls;

a second block having a shape of a square prism having a face with four edges of said first predetermined length and having rectangular sidewalls;

said first block and said second block being adjustably attached to one another a square face to a square face and in such a way that said first block and said second block are offset such that each sidewall of said square block is parallel to one of the adjacent sidewalls of said second block and a diagonal can be drawn through two corners of each block with one line;

said offset is equal to a desired predetermined molding reveal; and wherein said blocks are adjustably attached such that said first block can only move in such a way that the diagonal between the two corners of the first block remains collinear with the diagonal of said second block.

2. A molding guide in accordance with claim 1 wherein said blocks are adjustably attached, further including:

a channel created in said first block along said diagonal;

a bolt mounted normal to the face of and at a center of said square face of said second block, said bolt passing through said channel in said first block;

a fastener on the bolt releasably securing the first and second blocks relative to each other;

a guide element fixedly attached to one of the blocks;

said guide element being placed off the diagonal line and protruding normal to the face juxtaposed the other block face;

a guiding groove formed in the other of said two blocks deep enough to house said guide element; and said guiding groove being formed in a line parallel to and offset from said diagonal at a position across from said guide element on the square face of the other block.

3. A molding guide in accordance with claim 2 wherein said first predetermined length of said four edges is equal to approximately two and one half inches.

4. A molding guide in accordance with claim 1 wherein said first predetermined length of said four edges is equal to approximately two and one half inches.

* * * * *